United States Patent [19]
Daigle et al.

[11] 3,865,618
[45] Feb. 11, 1975

[54] INCREASING FLAME RETARDANCE OF CELLULOSE TEXTILE WITH 1,3,7-TRIAZA-5-PHOSPHABICYCLO(3.3.1)NONANE-3,7-DICARBONITRILE

[75] Inventors: Donald J. Daigle, New Orleans; Armand B. Pepperman, Jr.; Floyd L. Normand, both of Metairie, all of La.

[73] Assignee: The United States of America as represented by the Secretary of Agriculture, Washington, D.C.

[22] Filed: June 28, 1973

[21] Appl. No.: 374,584

[52] U.S. Cl. .............. 117/136, 260/551 C, 252/8.1
[51] Int. Cl. ............................................ C09j 5/18
[58] Field of Search ................. 260/551 C; 252/8.1; 117/136

[56] References Cited
OTHER PUBLICATIONS

Daigle, Reeves and Donaldson, Text. Res. J., 40, 580 (1970).
Reeves and Guthrie Chem. Abstr., 52, p. 2421b (1958).
Trefonas et al., Jour. of Heterocyclic Chem., Dec. 1972, Vol. 9, No. 6, p. 1295–1298.

*Primary Examiner*—Charles E. Van Horn
*Assistant Examiner*—Neal Kalishman
*Attorney, Agent, or Firm*—M. Howard Silverstein; Max D. Hensley

[57] ABSTRACT

3,7 Dicyano-3,5,7-Triaza-1-phosphabicyclo [3.3.1] nonane was prepared. The phosphine was converted to the phosphine oxide derivative by reaction with tertiary butyl hydroperoxide and to the methyl phosphonium iodide derivative by reaction with methyl iodide.

1 Claim, No Drawings

INCREASING FLAME RETARDANCE OF CELLULOSE TEXTILE WITH 1,3,7-TRIAZA-5-PHOSPHABICYCLO(3.3.1)NONANE-3,7-DICARBONITRILE

A non-exclusive, irrevocable, royalty-free license in the invention herein described, throughout the world for all purposes of the United States Government, with the power to grant sublicenses for such purposes, is hereby granted to the Government of the United States of America.

This invention relates to 1,3,7-triaza-5-phosphabicyclo [3.3.1] nonane 3,7-dicarbonitrile and to phosphine oxide and methyl phosphonium iodides derived therefrom, which are useful as flame retardants for cellulosic textiles and to methods of their preparation.

The main object of the instant invention is to disclose 1,3,7-triaza-5-phosphabicyclo [3.3.1] nonane-3,7-dicarbonitrile, 1,3,7-triaza-5-phosphabicyclo [3.3.1] nonane-3,7-dicarbonitrile-5-oxide, and 3,7-dicyano-5-methyl-1,3,7-triaza-5-phosphoniabicyclo [3.3.1] nonane iodide.

Searching the prior art we find that the simples process for the preparation of tris (amino methyl) phosphines is conducted by reacting a secondary amine with tris(hydroxymethyl) phosphine by itself or in the presence of formaldehyde [K. A. Petrov, V. A. Parshina, B. A. Orlov, and G. M. Trypina, Fhur. Obshch. Khim., 32, 4017(1962)]. The amine of the present invention differs from those of the prior art in that cyanamide is employed rather than simple secondary amines. Thus the phosphine of the present invention is of a new type.

In the course of the investigation we have found that a phosphine having the graphic formula

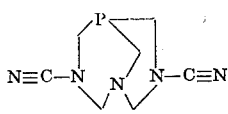

can be prepared by reacting tris(hydroxymethyl)phosphine with formaldehyde and cyanamide in the presence of some phosphoric acid.

The compound can also be prepared by neutralizing tetrakis (hydroxymethyl)phosphonium chloride with dibasic sodium phosphate to a pH about 4 and reacting the resulting solution with cyanamide.

In accordance with the present invention the reaction of tris(hydroxymethyl)phosphine with formaldehyde and cyanamide in the presence of phosphoric acid is carried out by mixing the reagents in an appropriate solvent and letting the final solution stand at room temperature overnight. The solvent may be a polar solvent such as water or ethyl alcohol and the preferred solvent is water. The phosphine product was identified by infrared and proton magnetic resonance spectra, and by elemental analysis.

Further, in accordance with the present invention 1,3,7-triaza-5-phosphabicyclo [3.3.1] nonane-3,7-dicarbonitrile-5-oxide was prepared by reaction of 1,3,7-triaza-5-phosphabicyclo [3.3.1] nonane-3,7-dicarbonitrile with a peroxide in an appropriate solvent. The preferred peroxide is teritary butyl hydroperoxide and the preferred solvent is butyl alcohol. The preferred peroxide is teritary butyl hydroperoxide and the preferred solvent is butyl alcohol.

In accordance with the present invention 3,7-dicyano-5-methyl-1,3,7-triaza-5-phosphoniabicyclo [3.3.1] nonane iodide was prepared by reaction of 1,3,7-triaza-5-phosphabicyclo [3.3.1] nonane-3,7-dicarbonitrile with methyl iodide in an appropriate solvent. The preferred solvent is acetone.

The phosphines are useful as flame retardants for cellulosic material and also as intermediates to other chemical compounds. Cotton fabric was made flame retardant by impregnating the fabric with a 15% aqueous solution of the phosphine and drying the fabric. The concentration of the flame retardant may be varied above or below 15% depending on the degree of flame retardancy desired.

The following examples illustrate the methods of carrying out the invention and are included for purposes of illustration, not as a limitation thereof.

EXAMPLE 1

Preparation of 1,3,7-triaza-5-phosphabicyclo [3.3.1] nonane-3,7-dicarbonitrile.

Tris(hydroxymethyl)phosphine (12.4 gram, 0.1 mole) and formalin (8.0 gram, 0.1 mole) were dissolved in 16 grams water and the resulting solution cooled to 5°–10°C. Phosphoric acid (8.0 gram, 0.08 mole) was added slowly to this solution taking care to prevent the temperature from rising above 25°C. Cyanamide (50% solution; 16.8 gram, 0.2 mole) was then added and this final solution allowed to stand at room temperature for 24 hours. The viscous solution was filtered and yielded 0.6 gram (6% yield) of crude 1,3,7-triaza-5-phosphabicyclo [3.3.1] nonane-3,7-dicarbonitrile [m.p. 246°–7°C (acetonitrile-benzene)].

Analysis: Calculated for $C_7H_{10}N_5P$: C, 43.08: H, 5.13; N, 35.90; P, 15.90%. Found: C, 42.82; H, 4.94; N, 35.75; P, 16.04%.

EXAMPLE 2

Preparation of 1,3,7-triaza-5-phosphabicyclo [3.3.1] nonane-3,7-dicarbonitrile-5-oxide.

3,7-dicyano3,5,7-triaza-1-phosphabicyclo [3.3.1] nonane (0.3 gram, 0.0015 mole) and tertiary butyl hydroperoxide (70% solution, 0.38 gram, 0.003 mole) were stirred in 300 ml of butanol for 4 hours at room temperature. The solution was filtered to yield 0.29 gram of crude 1,3,7-triaza-5-phosphabicyclo [3.3.1] nonane-3,7-dicarbonitrile-5-oxide (90% yield) [m.p. 285–6°C (acetonitrile-water)].

Analysis: Calculated for $C_7H_{10}N_5OP$: C, 39.81; H, 4.74; N, 33.18; P, 14.69%; mole wt., 211. Found: C, 40.2; H, 4.65; N, 32.67; P, 14.93%, mol. wt. 210 (boiling point elevation, water).

EXAMPLE 3

Preparation of 3,7-dicyano-5-methyl-1,3,7-triaza-5-phosphabicyclo [3.3.1] nonane iodide.

3,7-dicyano-3,5,7-triaza-1-phosphabicyclo [3.3.1] nonane (0.3 gram, 0.0015 mole) and methyl iodide (0.6 gram, 0.004 mole) were refluxed in 30 ml acetone for 3 hours. The solution was filtered to yield 0.5 gram of crude 3,7-dicyano-5-methyl-1,3,7-triaza-5-phosphabicyclo [3.3.1] nonane iodide (96% yield) [m.p. 276–7°C (acetonitrile-dimethyl sulfoxide)].

Analysis: Calculated for $C_8H_{13}N_5PI$: C, 28.49; H, 3.86; N, 20.78; P, 9.20; I, 37.67%. Found: C, 28.45; H, 3.91; N, 20.55; P, 9.32; I. 37.49%.

EXAMPLE 4

Fabric Treatment

A water solution containing 15% by weight of 1,3,7-triaza-5-phosphabicyclo [3.3.1] nonane-3,7-dicarbonitrile was applied to 8 oz. cotton sateen fabric by passing through squeeze rolls to an 80% wet pickup and drying for 5 minutes at 80°C. The fabric had a 12% weight gain and was flame retardant.

The fabric treatments were evaluated by a well known rapid evaluation flame retardancy test which consists of cutting a small specimen (about 1 cm × 7 cm) of the fabric to be evaluated, placing the specimen above the flame of a kitchen match with the long axis of the fabric specimen at an angle of 180° to the flame, igniting the specimen (if it can ignite), removing the flaming specimen from the flame, and rotating the specimen until the flame is extinguished, and recording that angle. (The 0° angle would be where the flame is at the top of the specimen, and the most severe test would be where the flame would be at the bottom. This would be the 180° angle.)

The specimens of Example 4 did not support combustion upon being submitted to this rapid evaluation test; therefore, they passed the flame retardancy test.

Comparable results were obtained with (2) and (3).

We claim:

1. A process for imparting to a cellulosic textile the quality of flame retardancy, comprising:
   a. impregnating the cellulosic textile with an aqueous solution containing about 15% by weight of a phosphine compound selected from the group consisting of 1,3,7-triaza-5-phosphabicyclo [3.3.1] nonane-3,7-dicarbonitrile, 1,3,7-triaza-5-phosphabicyclo [3.3.1] nonane-3,7-dicarbonitrile-5-oxide, and 3,7-dicyano-5-methyl-1,3,7-triaza-5-phosphabicyclo [3.3.1] nonane iodide to a weight pickup of about 80%, and
   b. drying the wet impregnated textile for about 5 minutes at about 80°C to obtain a treated fabric with about 12% weight gain.

* * * * *